(12) United States Patent
Opietnik et al.

(10) Patent No.: US 11,098,179 B2
(45) Date of Patent: Aug. 24, 2021

(54) POLYSACCHARIDE SUSPENSION, METHOD FOR ITS PREPARATION, AND USE THEREOF

(71) Applicant: NUTRITION & BIOSCIENCES USA 4, INC., Rochester, NY (US)

(72) Inventors: Martina Opietnik, Vöcklabruck (AT); Johann Männer, Weyregg (AT); Markus Hager, Attnang-Puchheim (AT); Sigrid Redlinger, Lenzing (AT); Gert Kroner, Seewalchen (AT)

(73) Assignee: NUTRITION & BIOSCIENCES USA 4, INC., Rochester, NY (US)

(*) Notice: Subject to any disclaimer, the term of this patent is extended or adjusted under 35 U.S.C. 154(b) by 0 days.

(21) Appl. No.: 16/681,226

(22) Filed: Nov. 12, 2019

(65) Prior Publication Data
US 2020/0079932 A1 Mar. 12, 2020

Related U.S. Application Data

(63) Continuation of application No. 16/248,254, filed on Jan. 15, 2019, now abandoned, which is a continuation of application No. 15/932,303, filed as application No. PCT/AT2016/000007 on Feb. 3, 2016, now abandoned.

(30) Foreign Application Priority Data

Feb. 6, 2015 (AT) .................................. A 56/2015

(51) Int. Cl.
*C08L 5/00* (2006.01)
*C08B 37/00* (2006.01)
*C08J 3/05* (2006.01)
*C09D 105/00* (2006.01)

(52) U.S. Cl.
CPC ............ *C08L 5/00* (2013.01); *C08B 37/0009* (2013.01); *C08J 3/05* (2013.01); *C09D 105/00* (2013.01); *C08J 2305/00* (2013.01); *C08L 2201/54* (2013.01); *C08L 2203/02* (2013.01); *C08L 2203/16* (2013.01)

(58) Field of Classification Search
None
See application file for complete search history.

(56) References Cited

U.S. PATENT DOCUMENTS

| 6,541,627 | B1 * | 4/2003 | Ono | ........................... C08J 3/09 536/56 |
| 7,000,000 | B1 * | 2/2006 | O'Brien | ................... C12P 19/08 536/123.12 |
| 2005/0059633 | A1 | 3/2005 | van Geel-Schuten | |

(Continued)

FOREIGN PATENT DOCUMENTS

| JP | 11349470 A | | 6/1998 | |
| WO | WO-0105838 A1 | * | 1/2001 | ................ C08L 1/02 |
| WO | WO-2013006876 A1 | * | 1/2013 | ............. C08K 3/016 |

OTHER PUBLICATIONS

WO-2013006876-A1—English translation (Year: 2013).*
JPH11349470A—English translation (Year: 1998).*

*Primary Examiner* — Stefanie J Cohen

(57) ABSTRACT

The present invention relates to a novel stable colloidal polysaccharide suspension containing α(1→3)-glucan, a cost-effective method for its preparation, and possible uses of these polysaccharide suspensions.

13 Claims, 9 Drawing Sheets

Microscopic view of the glucan gel, 10%

(56) References Cited

U.S. PATENT DOCUMENTS

2011/0014345 A1    1/2011   Pilling
2013/0196384 A1*   8/2013   Caimi .................... C12P 19/44
                                                                                                   435/97
2015/0080220 A1    3/2015   Yao et al.

* cited by examiner

Fig. 1: Comparison of the glucan gels prepared using Ultraturrax and HDH, respectively
Glucan Gel nach UT = Glucan gel after UT
Glucan Gel nach HDK = Glucan gel after HDH
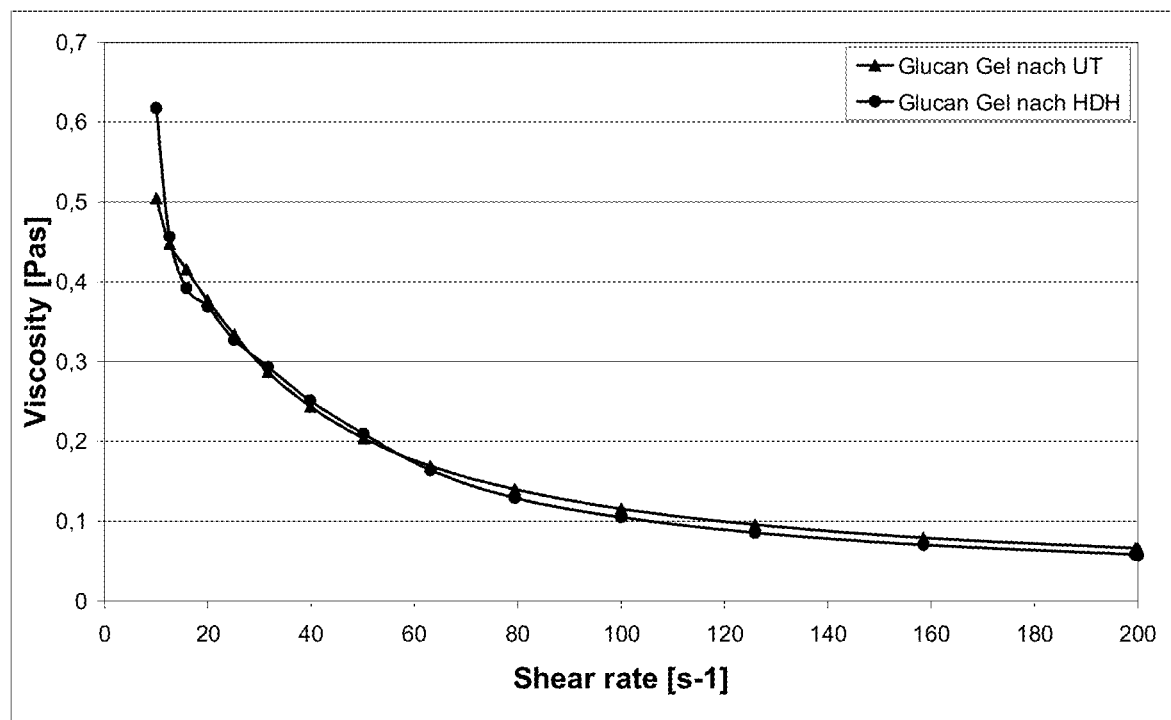

Fig. 2: Optical assessment of the glucan gel from dried glucan precursor (DP approx. 1,000)
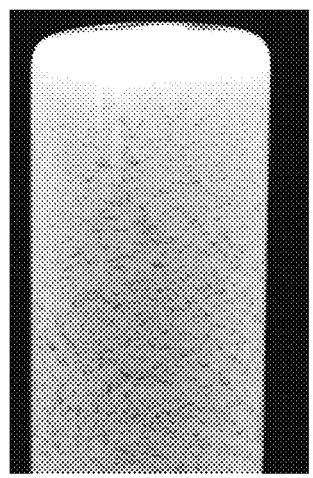

Fig. 3: Viscosity and shear stress of the glucan gel 4%, at shear rates from 10 - 200 s$^{-1}$
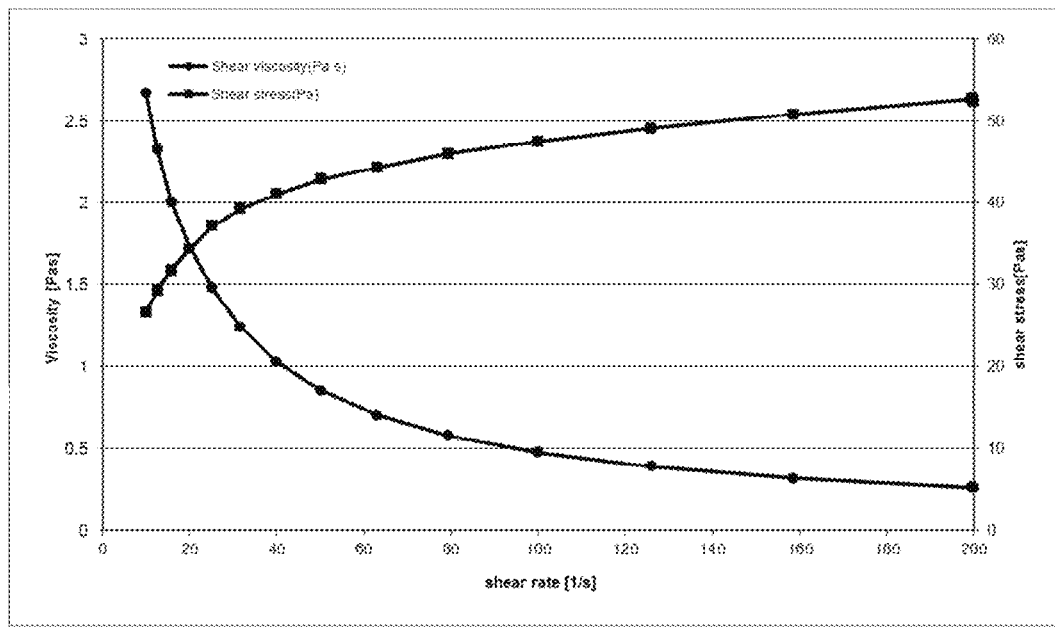
Fig. 4: Microscopic image of the glucan gel
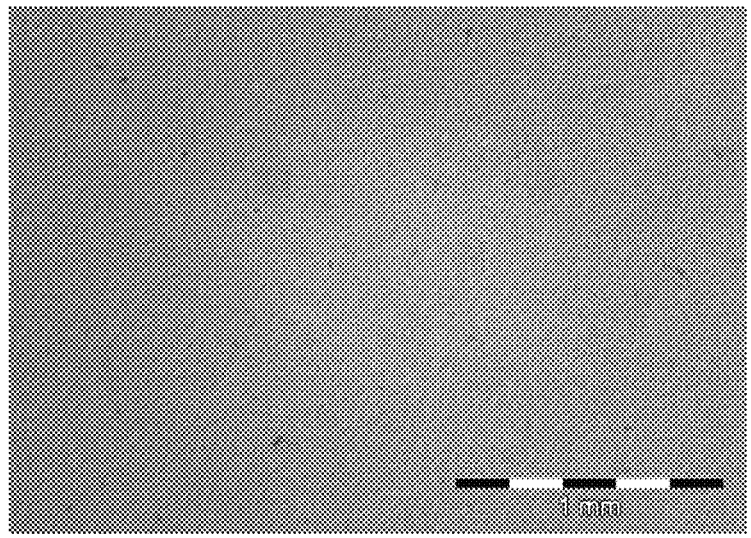

Fig. 5: Optical assessment of the glucan gel
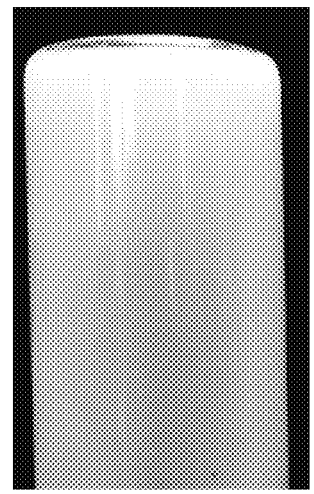
Fig. 6: Transparency of the glucan film
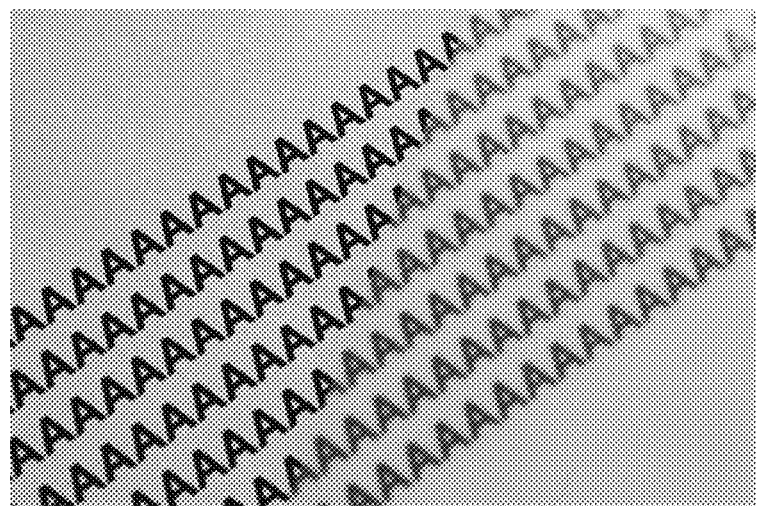

Fig. 7: SEM images of the air-dried glucan films. Left: skewed view of the surface, right: cross-section through the film
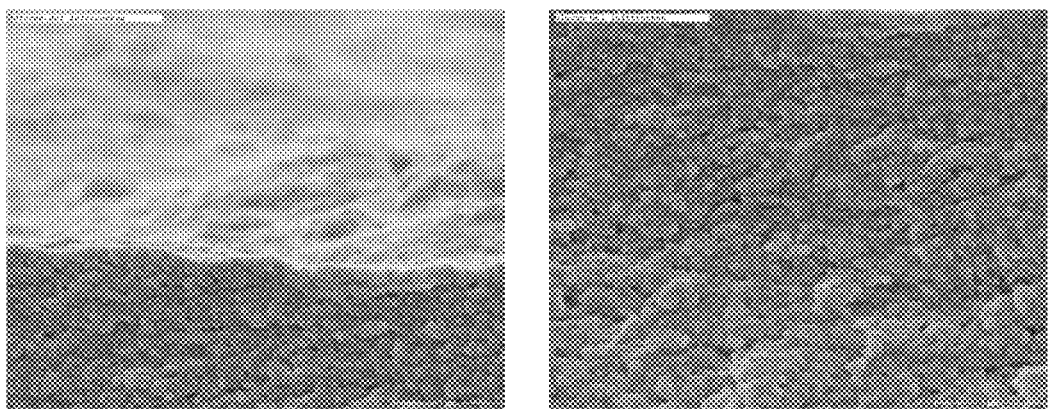
Fig. 8: SEM images of the freeze-dried glucan gel
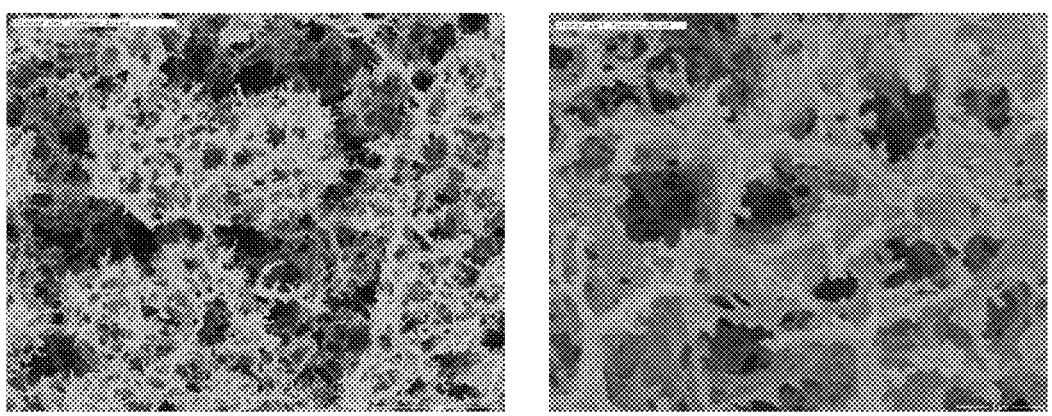

Fig. 9: Comparison of the viscosities of the differently concentrated glucan gels
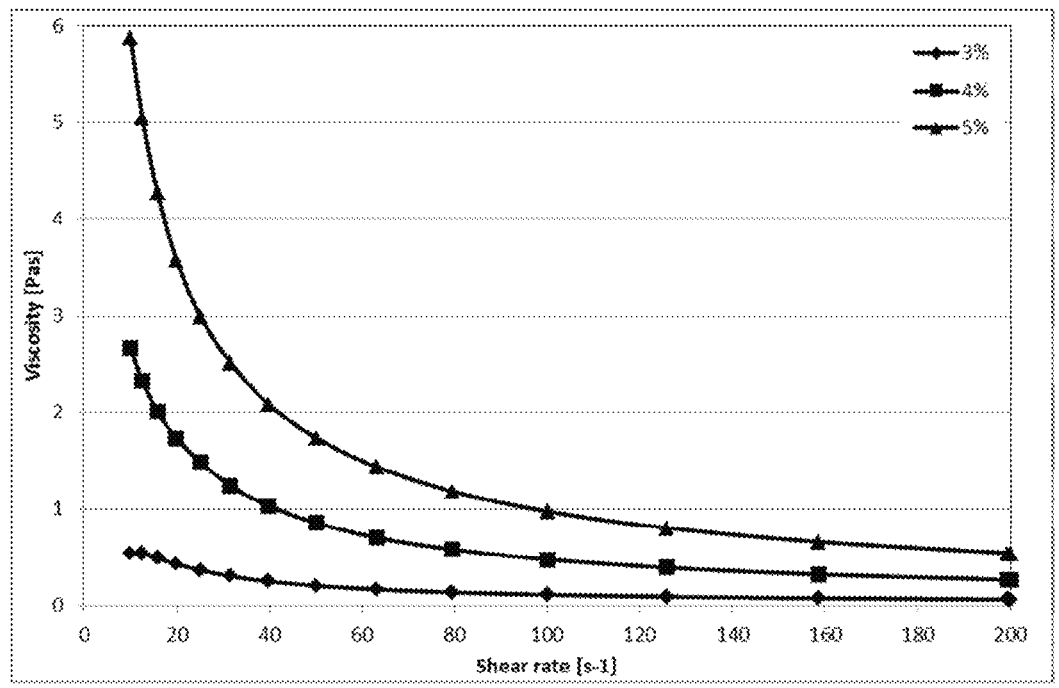
Fig. 10: Schematic view of Büchi Mini Spray Dryer B-290
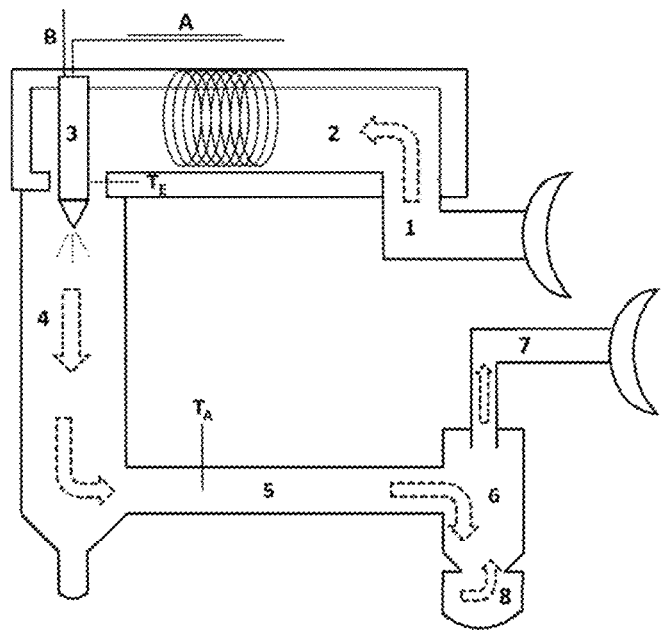

Fig. 11: Particle size distribution of the spray-dried glucan gel in iso-propanol
Verteilungssumme = distribution sum
Verteilungsdichte = distribution density
Partikelgröße = particle size
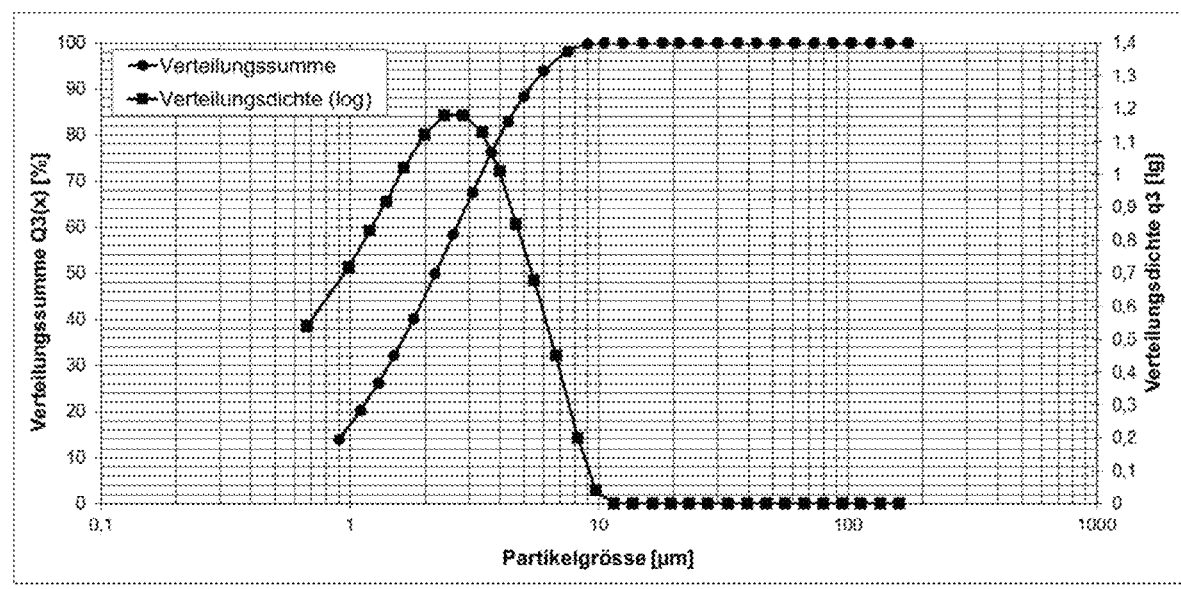

Fig. 12: Viscosity comparison between glucan suspensions, 4% and 10%
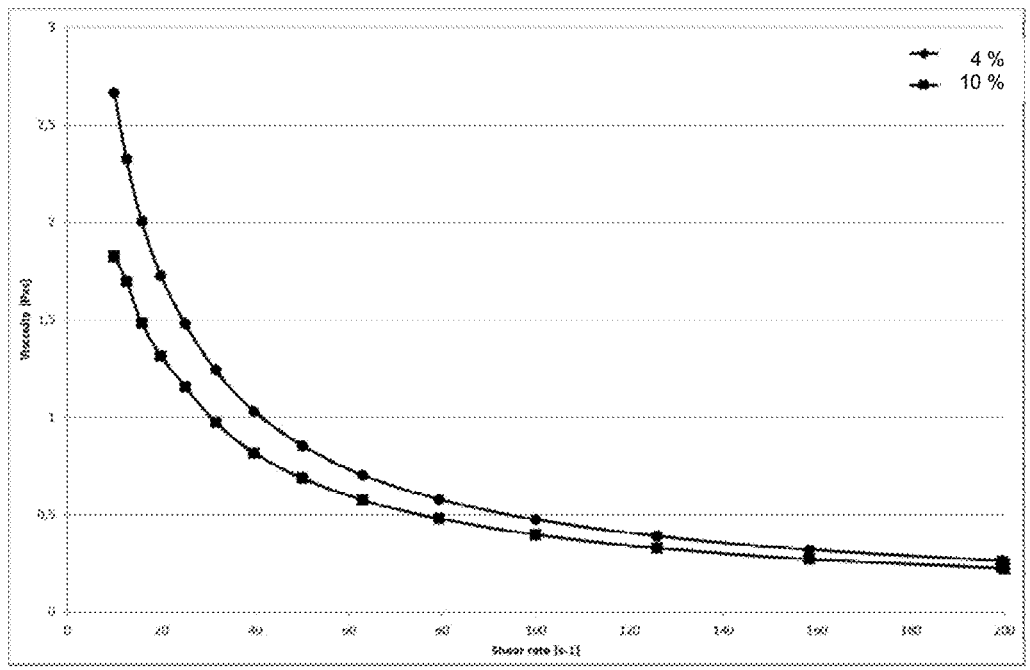

Fig. 13: Microscopic view of the glucan gel, 10%
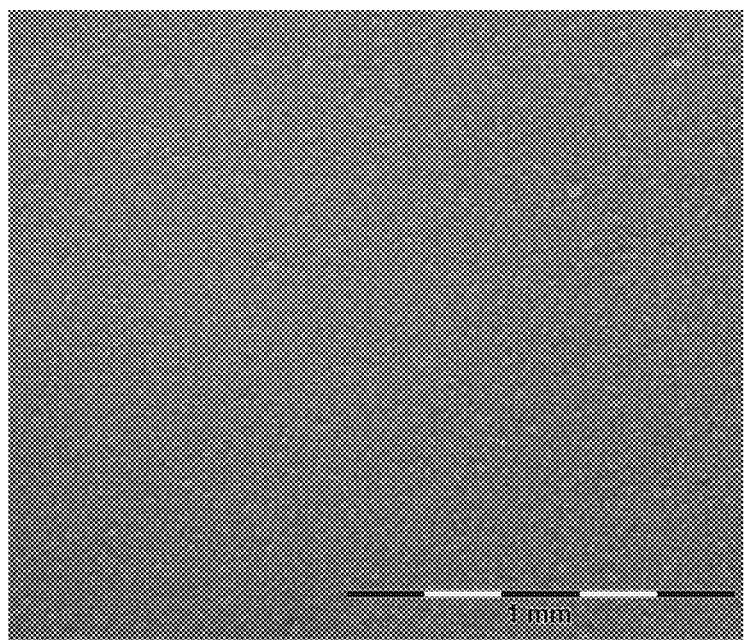

POLYSACCHARIDE SUSPENSION, METHOD FOR ITS PREPARATION, AND USE THEREOF

The present application is a continuation of U.S. patent application Ser. No. 16/248,254, published as U.S. Patent Application Publication No. 2019-0218373, now abandoned, which is a continuation application of U.S. application Ser. No. 15/932,303, published as U.S. Patent Application Publication No. 2018-0273731, now abandoned, which is the national-stage entry under 35 U.S.C. § 371 of International Patent Application No. PCT/AT2016/000007, filed Feb. 3, 2016, which claims priority to Austrian Patent Application No. A56/2015, filed Feb. 6, 2015, the entire disclosure of each of which is incorporated by reference herein.

BACKGROUND OF THE INVENTION

Field of the Invention

The present invention relates to a novel stable colloidal polysaccharide suspension containing (1→3)-glucan, a cost-effective method for its preparation, and possible uses of these polysaccharide suspensions. Such suspensions are often also referred to as "gels", and in the present invention both terms shall be construed as synonymous.

Prior Art

It is known that natural polysaccharides such as xanthan gum, alginate, guar gum, starch, etc., and also cellulose derivatives such as carboxymethyl cellulose, hydroxymethylpropyl cellulose dissolve as colloids in water and, in certain conditions, exhibit gel-forming capacity. Due to their water solubility, the above-mentioned substances do not form stable colloidal suspensions.

Cellulose is the most widely encountered polysaccharide worldwide. The preparation of suspensions from nanofibrillar cellulose and fibrous pulp gels having cellulose I structure, respectively, is known. Relevant prior art patents and publications are cited in WO2013/006876A1. The preparation of cellulose gels according to the amine oxide process and having cellulose II structure is described in WO2013/006876A1. Meanwhile, it was found that it is also possible to use a high pressure homogenizer to prepare a phase-stable cellulose suspension with a cellulose concentration between 0.1 and 4.0% by weight and a water retention capacity from 500 to 5000% from a spinning dope according to the amine oxide process with a higher cellulose content (for example of 13% by weight of cellulose).

Compared to microfibrillated cellulose or other types of nanocellulose, cellulose gels prepared according to the amine oxide process (the solvent used is a tertiary amine oxide, preferably N-methylmorpholine-oxide) exhibit significant product advantages: They no longer have a purely fibrous structure, but are largely isotropic. The particles are highly swollen and form a 3-dimensional network. These gels can be obtained by precipitating various molded bodies from the spinning dope, weakening these molded bodies through enzymatic treatment, coarse comminution, and subsequent grinding in a high pressure homogenizer.

U.S. Pat. No. 7,000,000 describes fibers obtained by spinning a solution of polysaccharides that consist substantially of hexose repeat units linked via α(1→3)-glycosidic bonds. These polysaccharides can be prepared by bringing an aqueous solution of saccharose into contact with GtfJ glucosyl transferase, isolated from *Streptococcus salivarius* (Simpson et al. Microbiology, vol 41, pp 1451-1460 (1995)). As used herein, "substantially" means that there may be sporadic defects within the polysaccharide chains, where other bond configurations occur. For the purposes of the present invention, these polysaccharides shall be referred to as "α(1→3)-glucan".

A disclosure of the preparation of such glucans can be found in U.S. Pat. No. 6,284,479 A1: the polysaccharide mixtures described therein are to contain α(1→3)-, α(1→6)-, (1→2)- and (1→4)-linked glucans in proportions that were not explained in further detail. These products shall be used, entirely or partially, replace starch or latex in coatings. However, U.S. Pat. No. 6,284,479 A1 does not provide any further details in this regard.

U.S. Pat. No. 7,000,000 first discloses possible ways to enzymatically prepare α(1→3)-glucan from monosaccharides. In this way, relatively short-chained polysaccharides can be prepared without the loss of monomer building blocks, as the polymer chains are built using the monomer building blocks. In contrast to the preparation of short-chained cellulose molecules, the preparation of α(1→3)-glucan is the more cost-effective, the shorter the polymer chains are, as in that case only a very short residence time in the reactors will be required.

Another option for the enzymatic preparation of α(1→3)-glucan from monosaccharides is disclosed in WO2013/036968A1 and WO2013/036918A2. According to this method, a particularly pure α(1→3)-glucan, substantially without the formation of other polysaccharides, can be prepared.

Glucan gels are known in literature, however, none of those found contains α(1→3)-glucan. Those found in literature are either (1→4)-glucans produced by glucan phosphorylases (JP2006211989) and processed into a gel by dissolving in alkaline medium and renewed precipitating (US2003185863, WO2012073019A1). Or β(1→3)-glucans that are water soluble and are processed into a gel by adding starch and plasticizers (US2003185863). A direct preparation of such gels without preceding dissolving and precipitating or other chemical pretreatments is not known.

OBJECT

Compared to the state of the art, the object was to provide a phase-stable colloidal polysaccharide suspension whose preparation requires no chemical or enzymatic pretreatment of the polysaccharide and offers high energy efficiency. The polysaccharide base material should be inexpensive to produce, and the process of preparing the suspension should be simplified as compared to existing methods.

BRIEF DESCRIPTION OF THE DRAWINGS

FIG. 1 is a graph comparing the viscosities of glucan gels prepared using Ultraturrax and HDH.

FIG. 2 is an image of an exemplary glucan gel dispersion obtained from dried glucan precursor (DP approx. 1,000).

FIG. 3 is a graph plotting shear viscosity and shear stress of an exemplary glucan gel, at shear rates from 10-200 $s^{-1}$.

FIG. 4 is a magnified image of an exemplary glucan gel at 4% by weight.

FIG. 5 is an image of a uniform dense film of an exemplary glucan gel at 4% by weight formed in a glass tube.

FIG. 6 is an image depicting the transparency of an exemplary glucan film on a PES sheet at 4% by weight.

FIG. 7A and FIG. 7B are SEM images of air-dried exemplary glucan films. FIG. 7A is a top view of the surface at an angle and FIG. 7B is cross-section view through the air-dried glucan film.

FIG. 8A and FIG. 8B are SEM images of a freeze-dried glucan gel at 4% by weight.

FIG. 9 is a graph comparing of the viscosities of exemplary glucan gels at 3% by weight, 4% by weight and 5% by weight.

FIG. 10 is a schematic diagram of a Büchi Mini Spray Dryer 8-290.

FIG. 11 is a graph of particle size distribution of a spray-dried glucan gel in iso-propanol.

FIG. 12 is a graph of particle size distribution of exemplary glucan suspensions at 4% by weight and 10% by weight.

FIG. 13 is a magnified image of an exemplary glucan gel dispersion at 10% by weight.

DESCRIPTION OF THE INVENTION

Surprisingly, this object was achieved by using biotechnologically produced and never-dried α(1→3)-glucan. From the polysaccharide described in U.S. Pat. No. 7,000,000, and particularly in WO2013/036968A1 and WO2013/036918A2, as long as it was never dried, it is possible to prepare, by solely mechanical treatment, a polysaccharide suspension that has no fibrillar structure and forms a 3-dimensional network.

The α(1→3)-glucan can be prepared by bringing an aqueous solution of saccharose into contact with GtfJ glucosyltransferase isolated from *Streptococcus salivarius* (Simpson et al. Microbiology, vol 41, pp 1451-1460 (1995)).

Hence, the solution of the above-mentioned object consists in providing a phase-stable colloidal polysaccharide suspension that is characterized in that the polysaccharide consists at least partly of α(1→3)-glucan, that the α(1→3)-glucan was never dried during its preparation, that the suspension was prepared from a press cake having a polysaccharide content between 4 and 80% by weight, preferably between 15 and 45% by weight, and that the polysaccharide concentration of the suspension is between 0.01 and 50% by weight, preferably between 1.0 and 20% by weight.

The α(1→3)-glucan content of the polysaccharide may be between 1 and 100% by weight, more preferably between 80 and 100% by weight. The remaining polysaccharides can preferably be cellulose gels, more preferably such that were prepared according to the amine oxide process and have cellulose II structure. For example, such gels can be prepared according to WO2013/006876A1. They can also be prepared according to the amine oxide process, as already described further hereinabove, with a cellulose concentration between 0.1 and 4.0% by weight from a spinning dope with a higher cellulose content (for example, of 13% by weight of cellulose) by using a high pressure homogenizer.

Furthermore, the remaining polysaccharides can be gel-forming polysaccharides known to those skilled in the art, such as cellulose derivatives, for example carboxymethyl cellulose, or starch. Such mixtures can for example be employed advantageously in the paper industry.

The remaining polysaccharides can also be other glucans, particularly α(1→6)-, (1→2)-, and (1→4)-linked glucans.

In particular, the polysaccharide suspension according to the invention is also advantageous because it was prepared without chemical or enzymatic pretreatment, without high pressures, and without high shear rates during comminution, as well as without dissolving or precipitating steps.

In a preferred embodiment, a dispersing unit which generates a low shear rate as compared to, for example, high press homogenizers, for example, an Ultraturrax® mixer or a colloid mill, is employed during the preparation of the polysaccharide suspension from the press cake.

The above-mentioned remaining polysaccharides can preferably be added to the α(1→3)-glucan during this suspension preparation process.

According to the invention, the polysaccharide suspension may, apart from the polysaccharide material, also contain 1 to 200% by weight, related to the polysaccharide quantity, in incorporated additives selected from the group comprising pigments, titanium oxides, especially substoichiometric titanium dioxide, barium sulfate, ion exchangers, polyethylene, polypropylene, polyester, latex, activated carbon, polymeric superabsorbents, and flame retardants.

In a preferred embodiment of the inventive method at least 90% of the α(1→3)-glucan are hexose units and at least 50% of the hexose units are linked via α(1→3)-glycosidic bonds. It is used in its never-dried form.

The suspension according to the invention is based on a water-containing, particularly an initially moist, α(1→3)-glucan that was never dried after its preparation. In water, α(1→3)-glucan is not dissolved as a colloid. No dissolving or subsequent precipitating step as described for glucan gels known in literature is necessary. Typically, for the preparation of cellulose gels, a pretreatment to weaken the surface structure (enzyme treatment, chemical treatment) with a downstream treatment by means of high pressure homogenizers is employed. For the preparation of the inventive polysaccharide suspensions, the above-mentioned preparation steps are not necessary; grinding using a dispersing unit (e.g., Ultraturrax® or a colloid mill) is sufficient. Compared to a cellulose gel, this reduces severalfold the total energy to be used. By avoiding a dissolving step during the preparation of the inventive suspensions, the introduction of residual quantities of solvent into the final suspension is prevented, which makes it particularly suited for applications in sensitive fields of use (foodstuffs, pharmaceuticals, and cosmetics).

The polysaccharide used as a base material for the suspension is preferably prepared according to U.S. Pat. No. 7,000,000 and more preferably according to WO2013/036968A1 and WO2013/036918A2. According to the invention, it is used in its initially moist state, i.e., it was never dried prior to preparing the suspension. It consists at least partly of α(1→3)-glucan. In the last procedural step of its preparation, it is pressed to a solids content between 4 and 80% by weight (related to the entire press cake), preferably to 15 to 45% by weight. By adding water, the desired polysaccharide concentration is adjusted to between 0.01 and 50% by weight (related to the total suspension), preferably to between 1.0 and 20% by weight, and by subsequent comminution using suitable dispersing units (e.g., Ultraturrax®, colloid mill, . . . ) the polysaccharide suspension is prepared. Pretreatments to weaken the molded bodies and subsequent treatments under high shear (for example in the high pressure homogenizer) are not absolutely necessary to form these polysaccharide gels. This constitutes a big advantage over cellulose gels. The solids content of the polysaccharide suspensions according to the invention shall be between 0.01 and 50% by weight, preferably between 0.1 and 20%, and the polysaccharide must never be dried during their preparation.

Summing up, the inventive method for preparing a polysaccharide suspension is characterized in that a) a press cake of an initially moist polysaccharide material is used as a base material, which polysaccharide material consists at least partly of α(1→3)-glucan, b) the press cake has a solids content between 4 and 80% by weight (related to the entire press cake), preferably from 15 to 45% by weight, c) the desired polysaccharide concentration is adjusted (typically by adding water) to between 0.01 and 50% by weight (related to the entire suspension), preferably to between 1.0 and 20% by weight, and d) subsequently, a comminution using a dispersing unit is carried out.

By additional treatment using a high pressure homogenizer as a grinding unit, it is possible to slightly improve the homogeneity of the suspension further if necessary.

However, once the polysaccharide prepared according to U.S. Pat. No. 7,000,000 and, in particular, according to WO2013/036968A1 and WO2013/036918A2 was already dried prior to the formation of the suspension, i.e., if it is no longer initially moist, by suspending it again in water gels will be formed only to a limited degree, which exhibit only low suspension stabilities and barely perceptible viscosity increases.

The degree of polymerization of the α(1→3)-glucan used in the method according to the invention, expressed as weight average $DP_w$, can be between 200 and 2,000; values between 400 and 1,000 are preferred. Due to the enzymatically controlled preparation of these glucans, their molecular weight distribution is very narrow. Such narrow distributions do not occur with natural polysaccharides.

The suspensions according to the invention exhibit, depending on the adjusted suspension concentration, film-forming properties and are particularly well suited for the preparation of polysaccharide layers, especially of sheets or coatings of other bodies, for example for coatings on different surfaces. This includes for example paper and packaging applications. If the suspensions according to the invention form films or layers, they act as barriers for many substances because of their uniform and dense structure. The polysaccharide suspension according to the invention is also suited as an additive to existing coating mixtures, e.g., in the paper industry. These films or layers can be formed by doctoring, spraying, or brushing, and/or by evaporating the aqueous phase and/or by additional measures such as heating or pressing. These films or layers can be connected firmly with the substrate (especially if this substrate also contains polysaccharides), or be separate. For the purpose of forming a film, wet strength agents or plasticizers can still be added to the polysaccharide suspension according to the invention. Also crosslinking of the films or layers is possible. The coatings can be continuous or also intermittent. Possible intermittent coatings are perforations or also the creation of artistically designed patterns or ornaments.

In addition to the production of films or coatings, also the production of other molded bodies from the polysaccharide suspension according to the invention is possible, for example, by means of extrusion or also by using suitable molds. For this purpose, it is advantageous to use the polysaccharide suspension according to the invention in as high a concentration as possible and to add suitable additives to it, respectively.

Furthermore, the suspensions according to the invention are well suited for all types of use where viscosity modifiers are needed in order to produce a cream-like consistency of the final products. The swollen polysaccharide particles are able to bind large quantities of water and thus already exert a thickening effect at lower concentrations than the polysaccharide suspensions prepared according to the state of the art.

The polysaccharide suspension according to the invention can be used as a base material for the preparation of dried polysaccharide powder which is also a subject-matter of the present invention. Simple drying of the inventive suspensions causes agglomerates and compact layers to be formed due to the formation of hydrogen bonds, which explains the film-forming properties. Special drying methods (spray drying, freeze drying) cause the formation of separated particles and fewer agglomerates. Spray drying also makes it possible to produce hybrid particles. The additives can be admixed to the suspension according to the invention during its preparation or only be added during the drying process. Another drying option is supercritical drying. In this case, the aqueous phase is replaced by a suitable, apolar solvent. The strength of the hydrogen bonds is reduced during removal of the solvent by means of supercritical $CO_2$ and the 3-dimensional network of the gel remains intact; so-called aerogels are formed.

Prior to the drying step, it is also possible to add so-called "spacers" to the inventive suspension. The spacers can, for example, be inorganic salts, polyethylene glycol, cellulose derivatives, or also other substances known as spacers in the field of gels. These spacers are deposited between the polysaccharide molecules and, by doing so, prevent the formation of excessively strong hydrogen bonds. Even though agglomerates are formed in this case, they can be redispersed. The formation of these agglomerates can be advantageous for dosing applications.

Hereinbelow, spray drying will be described in greater detail: the substrate to be dried, i.e., the polysaccharide gel according to the invention, is atomized into fine droplets via a nozzle. The droplets are discharged together with the hot air stream in a separating cyclone, and, during this process, water is evaporated. Different parameters such as the solids concentration, the size of the spraying nozzle, or the temperature difference between supply air and exhaust air flow can be used to influence the particle structure. The polysaccharide particles obtained in this process have an average diameter from less than 1 μm to up to 5 μm. The principle and the schematics of spray drying are shown in FIG. 8 wherein:

A: Supply of polysaccharide suspension
B: Supply of spray air (=compressed air)
TE: Temperature measurement for supply air
TA: Temperature measurement for exhaust air 1: Intake port for supply air
2: Electrical heater
3: Spraying nozzle
4: Spraying cylinder
5: Exhaust air
6: Separating cyclone
7: Exhaust air outlet filter
8: Collection vessel for dried particles The suspensions according to the invention have shear-diluting properties and, due to the simple application methods (brushing, spraying, etc.), can also be used as a binder for other materials, and they are sufficiently liquid so as to also fill small gaps. In such case, the other material is preferably present in a proportion of 200 to 1000% by weight, related to the quantity of polysaccharide. During drying, hydrogen bonds are formed, and, with them, a relevant "adhesive effect" is achieved.

In particular, when used as a binder, for example, for nonwovens or similar open structures, the polysaccharide suspension according to the invention can be applied such that either the entire structure or only parts thereof are penetrated by the suspension or a superficial coating is created. This results in yet another significant increase of the strength of the resulting composite material as compared to the original structure. When brought into contact with water, such structures reinforced with α(1→3)-glucan-containing suspensions can be broken up again, which makes them suitable for possible uses in the field of "flushable wipes", i.e., wipes that can be defibered in the waste water stream.

According to the invention, further functionalities can be incorporated into the polysaccharide suspension through the even introduction of additives. A variety of organic (chitosan, . . . ) and inorganic (nanosilver, zinc oxide, . . . ) additives as well as color pigments can be introduced into the suspension.

Hereinbelow, the invention will be described with reference to examples. However, the invention is expressly not limited to these examples, but also includes all other embodiments that are based on the same inventive concept.

EXAMPLES

General information: percentages are always to be understood as % by weight unless indicated otherwise.

Example 1

A press cake of water-containing, initially moist α(1→3)-glucan (dry matter content=17.6% by weight) is suspended in deionized water and, using an Ultraturrax® ("UT"), type IKA T50 basic, 6,000 rpm, is comminuted for 4 minutes. In this experiment, the suspension to be comminuted contained 3.05% by weight of α(1→3)-Glucan (atro). The suspension prepared in this way was divided into two subquantities, and one subquantity was additionally pumped in circulation via a high pressure homogenizer (HDH), type GEA Niro Soavi NS 1001L-2K, operating pressure 1,000 bar, for 2 passes. Then, the two glucan suspensions were characterized based on viscosity and water retention capacity.

The water retention capacity (WRC) of the glucan particles was determined as follows: an exactly defined quantity of suspension was introduced into special centrifuge tubes (with a drain for the water). Then, centrifuging was carried out for 15 min at 3,000 rpm, and the moist glucan was weighed immediately thereafter. The moist glucan was dried over night at 105° C., and then the dry weight was determined. The WRC was calculated according to the following formula:

$$WRC[\%] = (m_f - m_t)/m_t * 100$$

($m_f$=moist mass, $m_t$=dry mass)

The determined dry contents (TS) and WRC are compiled in Table 1.

TABLE 1

Dry contents and WRC of the glucan suspensions.

| Suspension after UT | | Suspension after UT + HDH | |
|---|---|---|---|
| TS [%] | WRC [%] | TS [%] | WRC [%] |
| 3.05 | 1203 | 3.01 | 1538 |

The viscosities of the two suspensions exhibit shear-diluting behavior and do not differ in their curves (FIG. 1). The viscosities were determined using a Malvern Kinexus rheometer with a cone plate measuring system (CP4/40 S0687 SS) in a shear rate range from 10-200$^{s-1}$.

For comparison purposes, experiments with dried glucans were conducted. The glucans used were linear glucans with different degrees of polymerization ($DP_w$ 1,000 and $DP_w$ 500) and a branched glucan. In each of the three cases, the gels formed were not uniform, and there was phase separation. The suspensions were adjusted to a solids content of 2-3%, pre-comminuted by treatment in the Ultraturrax® (UT, IKA T50 basic, 6,000 rpm) for 4 min, and then treated with the high pressure homogenizer for 2 passes at an operating pressure of 1,000 bar. Following that, dry content and WRC were determined (Table 2). The WRC is far below the values of the gels produced from initially moist glucan. Also, these suspensions exhibit no increase in viscosity.

TABLE 2

Dry contents and WRC of the gels from dried glucan

| Linear glucan DPw 1,000 | | Linear glucan DPw 500 | | Branched glucan | |
|---|---|---|---|---|---|
| TS [%] | WRC [%] | TS [%] | WRC [%] | TS [%] | WRC [%] |
| 2.23 | 247 | 2.20 | 164 | 2.77 | 203 |

The suspensions treated in this way were swollen overnight in order to make the surface more accessible. On the following day, the samples were treated again with the HDH for 4 passes at 1,000 bar. It was demonstrated that the dried glucans used are unsuitable for preparing suspensions: even after 6 passes on the HDH, there still was phase separation, and particles were visually recognizable (FIG. 2).

Example 2

By preparing a bigger quantity of glucan gel (4% by weight) in a pilot-plant-based experiment with a colloid mill (IKA Colloid Mill MK2000/10), it was to be demonstrated that even large quantities of polysaccharide can be processed into a homogeneous suspension without the use of high pressure homogenizers.

From 3.69 kg of never-dried, initially moist α(1→3)-glucan (TS=16.25%) and 11.3 kg of water, a glucan gel having a solids content of 3.9% was prepared by grinding in the colloid mill (IKA Colloid Mill MK2000/10). After 15 minutes of grinding with a gap of 0.1 mm at maximum output, the glucan gel was ready. Subsequently, it was characterized as follows:

Viscosity: the glucan gel was measured on the Malvern Kinexus rheometer with a cone plate measuring system (CP4/40 S0687 SS) in a shear rate range from 10-200 The suspension according to the invention exhibited shear-diluting behavior (FIG. 3).

Microscopy: the glucan gel was filled between two microscope slides, whereby a thin layer was formed. This layer was subjected to microscopic examination. A strip of adhesive tape (Scotch tape, matt, approx. 0.3 mm) was adhered to the rim of each lower slide in order to achieve uniform layer thickness. The photos were taken on the ZEISS Discovery V12 stereomicroscope with 50-fold magnification and bottom illumination (FIG. 4). Agglomerates can be recognized that are formed from the very small particles in the suspension. However, these agglomerates can not be felt when rubbed between the fingers and will disintegrate again under the slightest shear.

Glass tube method: 10 g of glucan gel were weighed into glass tubes (length=approx. 9.7 cm, Ø2.5 cm) provided with closure caps, shaken, placed upside down, and photographed after 10 seconds. The glass tube was positioned in front of a black background and illuminated from the above using a table lamp (distance to underlying surface about 22 cm).

The photos were taken using a Canon EOS450D digital camera. Again, no particles are visible (FIG. 5). A uniform, dense film is formed along the glass wall.

The film-forming properties of these suspensions were tested on different surfaces.

The suspension according to the invention of Example 2 was applied onto polyester (PES) sheets or glass by doctoring and spraying, respectively. Both coating methods produced continuous, uniform films that adhere readily to the substrates. FIG. 6 shows the transparency of such films on PES sheets: the right-hand side of the picture is covered with the coated PES sheet; the left-hand side is not covered.

SEM photos (Hitachi S-4000 SEM scanning electron microscope) were taken of the air-dried films; here, we see the structure of the dense layer which simultaneously exhibits a large inner surface (FIG. 7).

In addition, SEM photos were taken of the freeze-dried glucan gel (FIG. 8). Here, we can notice the 3-dimensional spongy network that is formed in the glucan gel and imparts to the inventive suspension its unique properties.

Example 3

Glucan gels having different solids concentrations were produced in a manner similar to Example 2. As the solids content increases, the viscosities of the suspensions increase (FIG. 9), while the water retention capacity (WRC) decreases. While suspensions having a solids content of 3 and 4% can still be processed with an HDH, suspensions having a solids content of 5% can only be comminuted with a device with lower shear such as an Ultraturrax IKA T50 basic ("IKA"), as the HDH is unable to pump such highly viscous suspensions. Table 3 shows that, as the solids content increases, the viscosity increases, but the WRC decreases at the same time.

TABLE 3

Comparison of viscosities and WRC of the various glucan gels after comminution.

| Treatment | after HDH | after IKA | after UT |
|---|---|---|---|
| TS [%] | 3 | 4 | 5 |
| WRC [%] | 1538 | 1504 | 506 |
| Viscosity [$50^{s-1}$] | 0.2009 | 0.8555 | 1.731 |

Example 4

In the following example, the 3% glucan gel from Example 3 was dried in a laboratory spray dryer (Büchi Mini Spray Dryer 8-290, see FIG. 10). The particle size distribution was determined by means of laser diffraction (measuring apparatus from Helos) in iso-propanol. Parameters: supply air temperature 180° C. and exhaust air temperature 62° C.; nozzle size 1.4 mm. The particle size distribution was as follows:

$x_{10}$=0.79 µm; $x_{50}$=2.2 µm; $x_{90}$=5.29 µm; $x_{99}$=8.27 µm.

Example 5

1.887 kg of never-dried, initially moist α(1→3)-glucan (TS=39.74%) and 5.613 kg of water were used to prepare a suspension with 10% of glucan by using an IKA mill (IKA MK2000/10 colloid mill). After 20 minutes of grinding with a gap of 0.1 mm and at maximum output, the glucan suspension was ready. A stable suspension was formed which in terms of its viscosity is comparable with the 4% glucan suspension from Example 2 (FIG. 12).

Furthermore, microscopic photos (FIG. 13) were taken of the gel from Example 5 under the conditions described in Example 2. Again, small particles can be noticed which, however, also in this case cannot be felt between the fingers.

What is claimed is:

1. A phase-stable, colloidal polysaccharide suspension, wherein:
   the polysaccharide comprises α(1→3)-glucan,
   the α(1→3)-glucan content of the polysaccharide is between 80% and 100% by weight,
   the α(1→3)-glucan was (i) never dried and (ii) not dissolved during its preparation,
   the suspension was prepared from a water-containing cake having a content of the polysaccharide of between 15% and 45% by weight, and
   the concentration of the polysaccharide in the suspension is between 1.0% and 20% by weight.

2. The polysaccharide suspension of claim 1, wherein at least 90% of the α(1→3)-glucan consists of hexose units and at least 50% of the hexose units are linked via α(1→3)-glycosidic bonds.

3. The polysaccharide suspension of claim 1, wherein substantially all of the glycosidic bonds of the α(1→3)-glucan are α(1→3)-glycosidic bonds.

4. The suspension of claim 1, wherein the suspension further comprises a pigment.

5. The suspension of claim 1, wherein the suspension further comprises titanium oxide.

6. The suspension of claim 1, wherein the suspension further comprises polyethylene.

7. The suspension of claim 1, wherein the suspension further comprises polypropylene.

8. The suspension of claim 1, wherein the suspension further comprises polyester.

9. The suspension of claim 1, wherein the suspension further comprises latex.

10. The suspension claim 1, wherein the suspension further comprises an additive in the amount of 1% to 200% of the weight of the polysaccharide.

11. The suspension of claim 1, wherein the weight-average degree of polymerization of the α(1→3)-glucan is between 200 and 2000.

12. The suspension of claim 1, wherein the suspension further comprises barium sulfate, an ion exchanger, activated carbon, a polymeric superabsorbent, or a flame retardant.

13. The suspension of claim 1, wherein the cake is a press cake.

* * * * *